united States Patent Office
3,450,667
Patented June 17, 1969

3,450,667
POLYMER COMPOSITIONS CONTAINING SULFUR AND PROCESS FOR PREPARING SAME
Adam F. Kopacki, Westwood, N.J., assignor to Stauffer Chemical Company, New York, N.Y., a corporation of Delaware
No Drawing. Filed June 10, 1966, Ser. No. 556,580
Int. Cl. C08f 45/04, 27/07, 29/04
U.S. Cl. 260—41
9 Claims

ABSTRACT OF THE DISCLOSURE

Homogeneous sulfur extended polymer compositions and the process for preparing same are provided. The polymers are normally solid α-olefin polymers formed from an α-mono-olefinic aliphatic hydrocarbon containing from 2 to 10 carbon atoms. The sulfur is present in the polymer in an amorphous polymeric or viscous state in an amount of from about 10 to about 45 percent.

---

This invention relates to polymer compositions and in particular to polymers extended with from 10 to 45% by weight of sulfur.

It is an object of the present invention to provide polymer compositions comprising a polymer and sulfur. It is a specifically important object of the invention to provide stable polymer compositions comprising a polymer extended with a high percentage of sulfur. It is a further object to provide a method of producing said compositions. Other objects and purposes will become manifest subsequently.

The aforesaid objects can be realized by combining or mixing the polymer with sulfur in its viscous or polymeric state. Since sulfur reaches its maximum viscosity on being heated for about 0.5 to 1.0 hour at 370° F., the polymer compositions of the invention are generally formulated by blending a mixture of polymer and sulfur under the aforesaid conditions. In actual practice the optimum temperature may vary slightly with the particular polymer, although I have attained generally excellent results by mixing the components from about 375° F. to about 425° F. for periods of from about 0.5–2.0 hours.

The compositions are formulated using any of the conventional procedures commonly employed in the plastic and polymer arts. An especially convenient and effective technique consists in blending the materials on heated rollers such as are found on a 2 roll plastics or rubber mill. Mixing of the sulfur and polymer is continued until a completely homogeneous mass is obtained.

By operating in accordance with the present invention I have prepared homogeneous, sulfur extended polymer compositions capable of holding up to about 50% sulfur. The term homogeneous as used herein refers to polymer compositions of sulfur and polymer wherein the sulfur and polymer remain substantially codispersed or intimately mingled. There is, in other words, little or no bleeding or exudation of the sulfur when the compositions are extruded, pressed, cast, or otherwise handled. When polymers are extended with non-viscous sulfur the maximum amount of sulfur which can be retained by the polymer is in the neighborhood of 10%; amounts in excess of this bleed out and deposit on the surface of the polymer substrate. The present invention thus provides stable sulfur extended polymers capable of holding as much as approximately five times the sulfur content of similar compositions made from ordinary crystalline sulfur.

The sulfur extended polymers described herein can be extruded or formed into a variety of useful shapes and configurations typical of which are films, sheets, rods, tubes and the like. The resulting tan colored articles are unusual in that their physical properties, i.e., tensile strength and elongation, etc., are markedly superior to like articles prepared from polymers without the sulfur additive. For instance, a polyethylene composition containing 45% sulfur can be blended and extruded at 375° F. to give a thin uniform tan colored film having tensile strength and elongation 25–30% higher than virgin polyethylene subjected to the same treatment.

The sulfur in the polymer compositions of the invention is believed to exist in the amorphous (viscous) state and therefore is more soluble in the polymeric substrate then ordinary or crystalline sulfur. Although I do not intend to be bound by any theory expounded herein, it is the aforegiven explanation which is believed to account for the high sulfur retention by the polymer.

The sulfur extended polymer compositions of the invention can be formulated using a wide variety of solid polymers and in this connection mention is made of the normally solid polymers derived from the polymerization of alpha-mono olefinic, aliphatic hydrocarbons containing from 2 to 18 carbon atoms, including such hydrocarbons substituted with halogen, e.g., chlorine and other hydrocarbon radicals such as aryl and alkyl radicals. Typical polymers are polyalpha-olefins as exemplified by polyethylene, polypropylene, poly-(3-methylbutene-1), poly-(4-methylpentene-1), poly(pentene-1), poly (3,3-dimethylbutene-1), poly(4,4-dimethylbutene-1), poly (octene-1), poly(decene-1), polystyrene and the like. Halogen polymers include polyvinyl chloride, polyvinylidene chloride, etc. Copolymers of such olefins are those prepared from ethylene and propylene or ethylene and the butenes or the like are also suitable. Also considered to be within the scope of this invention are polymers of substituted vinyl monomers such as vinyl chloride, vinylidene dichloride, vinyl acetate, acrylonitrile and the like.

The sulfur extended polymer compositions herein have several beneficial properties. These include change in the surface properties, change in the ultraviolet absorption and change in the oxidation characteristics of the polymers with which the sulfur is blended. An especially important benefit from an economical standpoint is the considerable savings in manufacturing the sulfur extended polymers of the invention. This arises from the fact that the sulfur extender is considerably cheaper than the polymer. The extended polymer compositions are, of course, useful for many purposes as a substitute for the "pure" polymers.

The invention is illustrated by the following non-limiting examples.

EXAMPLE 1

600 g. of low density polyethylene is placed on a 2 roll mill with rolls heated to 380° F. The roll speeds are maintained between about 29 feet/minute and 40 feet/minute to give a shear ratio of 1:1.4. When the resin has fluxed and formed a continuous band on the roll, 400 g. of sulfur (Rubbermakers 21–4) is added to the resin slowly at the nip of the rolls to insure intimate blending. As the blend mixes the color changes from a bright yellow color of sulfur to a tan color indicating a change from the ordinary melt to the viscous melt range of the sulfur. The mass on the mill changes from one of high fluidity to a very viscous mass with a consistency of masticating rubber. Time of mixing or blending by this method is about 1 to 1½ hours.

After blending is complete the mass is cut from the mill and either fed directly to the extruder or allowed to cool, then ground to pellets which can be extruded, molded or transformed into the desired shape.

Using the procedure and technique as above described for Example 1, the following polymers are extended with viscous sulfur.

Example 2.—Polypropylene
Example 3.—Polyisobutylene
Example 4.—Polyvinylchloride
Example 5.—Polystyrene

EXAMPLE 6

Employing the general procedure set forth in Example 1 supra, sulfur (Rubbermakers 21–4) was milled into low density polyethylene (USI 105–50) on a two roll mill at 375° F. Sufficient sulfur was added to comprise 40% by weight of the composition on the roll. Milling was continued for thirty minutes after complete addition of the sulfur. Films were then pressed from the milled sheet at a temperature of 375° F. and were checked for tensile strength and elongation. The pressed film produced in accordance with this example had low tensile strength, at least about 35% below that of low density polyethylene, and over a period of two weeks substantial quantities of the sulfur migrated to the surface (bloom).

X-ray powder diffraction patterns of the sulfur extended polymers resulting from Example 1 and Example 6 showed no lines for crystalline sulfur for the product of Example 1 and distinct lines for crystalline sulfur for the product of Example 6. Accordingly, the sulfur in the product of Example 1 is in an amorphous or non-crystalline state which is herein alternatively referred to as the viscous state or polymeric state of sulfur as contrasted with the product of Example 6 which contains its sulfur in the crystalline state. Apparently, the composition of Example 6 was not retained for a sufficiently long period of time on the heated rolls to cause conversion of the sulfur to the viscous state.

It is essential to the practice of the present invention that the mixture of sulfur and polymer be retained at a temperature in the viscous region of sulfur for a sufficient amount of time to permit essentially complete conversion to the viscous or polymeric sulfur form. Heating for shorter periods of time, say a few minutes, will not affect conversion and upon cooling a large amount of the sulfur will exude or bloom on the surface of the polymer. Further, it has been found that if the sulfur extended polymer of the present invention is reheated to be cast into a different shape, e.g., extruded, the reheating must be accomplished under essentially the same conditions of temperature as necessary to initially form a homogeneous sulfur extended polymer. To illustrate, if the sulfur extended polymer of the present invention is formed first in sheets, cooled and thereafter extruded to form rods or the like, the temperature of the material in the extruder must be maintained in the viscous region. Surprisingly, if the extrusion takes place at a lower temperature, the polymer composition resulting has all of the attributes of the compositions made initially at lower temperatures, i.e., sulfur is exuded, low tensile strength, etc. In commercial applications where it is necessary to first mix the polymer and sulfur and thereafter extrude or the like, it is preferable to heat the sulfur and polymer in the mixer until conversion of the sulfur is complete and thereafter feed directly to the extruder while maintaining the elevated temperature.

I claim:
1. A homogeneous sulfur extended polymer composition consisting essentially of a normally solid polymer selected from the group consisting of polyvinyl chloride, an α-mono-olefin homopolymer and copolymers prepared from a plurality of α-mono-olefins, said α-olefin containing from 2 to 10 carbon atoms and between about 10 and 45 percent by weight of the total composition of an amorphous polymeric sulfur composition.
2. The composition of claim 1 wherein the said normally solid α-olefin polymer is polyethylene.
3. The composition of claim 1 wherein the polymer is polyvinyl chloride.
4. The composition of claim 1 wherein the said normally solid α-olefin polymer is polypropylene.
5. The polymer composition of claim 1 wherein the said composition is in the form of a film.
6. The polymer composition of claim 4 wherein the said composition is in the form of a film.
7. A method of producing a sulfur extended polymer composition which comprises forming by intermixing a composition consisting essentially of from about 10% to about 45% by weight elemental sulfur and a solid polymer selected from the group consisting of polyvinyl chloride, an α-mono-olefin homopolymer and copolymers prepared from a plurality of α-mono-olefins, said α-olefin containing from 2 to 10 carbon atoms at a temperature in the viscous sulfur range of between about 375° F. and about 425° F. for a period of time to substantially convert the sulfur in said sulfur extended polymer composition to an amorphous polymeric form.
8. The method of claim 7 wherein the period of time is from about 0.5 to about 2.0 hours.
9. The method of claim 7 wherein the polymer is polyethylene.

References Cited

UNITED STATES PATENTS

| | | | |
|---|---|---|---|
| 3,127,379 | 3/1964 | Natta et al. | 260—30.8 |
| 3,290,266 | 12/1966 | Barnes et al. | 260—30.8 |
| 3,299,568 | 1/1967 | Tobolsky et al. | 260—30.8 |
| 2,450,771 | 10/1948 | Vaughn et al. | 260—30.8 |

OTHER REFERENCES

Tobolsky et al., Jour. Polymer Sci., pt. A, vol. 2, p. 1998, 1964.

JAMES A. SEIDLECK, *Primary Examiner.*

U.S. Cl. X.R.
260—30.8, 79.5